United States Patent
Mukaide et al.

(10) Patent No.: US 8,117,330 B2
(45) Date of Patent: Feb. 14, 2012

(54) INFORMATION PROCESSING DEVICE FOR RELAYING STREAMING DATA

(75) Inventors: Takanobu Mukaide, Tokyo (JP); Kazumitsu Takaku, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1608 days.

(21) Appl. No.: 11/283,305

(22) Filed: Nov. 18, 2005

(65) Prior Publication Data

US 2006/0156376 A1 Jul. 13, 2006

(30) Foreign Application Priority Data

Dec. 27, 2004 (JP) ................ P2004-376453

(51) Int. Cl.
*G06F 15/16* (2006.01)
(52) U.S. Cl. .......... 709/231; 713/400; 713/401; 710/52
(58) Field of Classification Search .......... 709/225–226, 709/228, 231; 370/235; 713/400, 401; 710/52
See application file for complete search history.

(56) References Cited

U.S. PATENT DOCUMENTS

| | | | | |
|---|---|---|---|---|
| 4,313,135 | A * | 1/1982 | Cooper ............... | 348/512 |
| 6,266,097 | B1 * | 7/2001 | Jiang et al. .......... | 348/511 |
| 7,088,398 | B1 * | 8/2006 | Wolf et al. .......... | 348/423.1 |
| 7,295,578 | B1 * | 11/2007 | Lyle et al. .......... | 370/503 |
| 2002/0095613 | A1 * | 7/2002 | Matsuoka et al. ...... | 713/400 |
| 2004/0039955 | A1 * | 2/2004 | Gomm .............. | 713/401 |
| 2004/0098633 | A1 * | 5/2004 | Lienhart et al. ....... | 713/400 |
| 2004/0187043 | A1 * | 9/2004 | Swenson et al. ....... | 713/400 |
| 2004/0258193 | A1 * | 12/2004 | Mukaide ............ | 377/47 |
| 2005/0015805 | A1 * | 1/2005 | Iwamura ............. | 725/79 |
| 2005/0154917 | A1 * | 7/2005 | deCarmo ............ | 713/201 |
| 2005/0166135 | A1 * | 7/2005 | Burke et al. ......... | 715/500.1 |
| 2006/0002681 | A1 * | 1/2006 | Spilo et al. .......... | 386/46 |
| 2006/0072399 | A1 * | 4/2006 | Fujimoto et al. ...... | 369/47.1 |
| 2006/0106961 | A1 * | 5/2006 | Ebata et al. ......... | 710/52 |
| 2006/0209880 | A1 * | 9/2006 | Chang et al. ........ | 370/464 |
| 2009/0269037 | A1 * | 10/2009 | Mukaide et al. ...... | 386/105 |
| 2010/0042239 | A1 * | 2/2010 | Moore et al. ........ | 700/94 |
| 2010/0046586 | A1 * | 2/2010 | McCorkle ........... | 375/140 |
| 2010/0189130 | A1 * | 7/2010 | Veltman et al. ....... | 370/472 |

FOREIGN PATENT DOCUMENTS

| | | | |
|---|---|---|---|
| GB | 2273215 A | * | 6/1994 |
| JP | 2002-006817 | | 1/2002 |
| JP | 2003-348489 A | | 5/2003 |

OTHER PUBLICATIONS

English translation of CN Office Action, application No. CN200510123268.5, mailed Dec. 21, 2007.

* cited by examiner

*Primary Examiner* — Douglas Blair
*Assistant Examiner* — Oleg Survillo
(74) *Attorney, Agent, or Firm* — Blakely, Sokoloff, Taylor & Zafman LLP

(57) ABSTRACT

According to one embodiment, a method is described for relaying streaming data from a first external device and to transmit streaming data to a second external device. The method comprises (i) receiving a first delay time to be needed by the second external device from the second external device, (ii) calculating a third delay time by adding the first delay time to a second delay time to be needed in the information processing device, and (iii) transmitting the third delay time to the first external device.

14 Claims, 4 Drawing Sheets

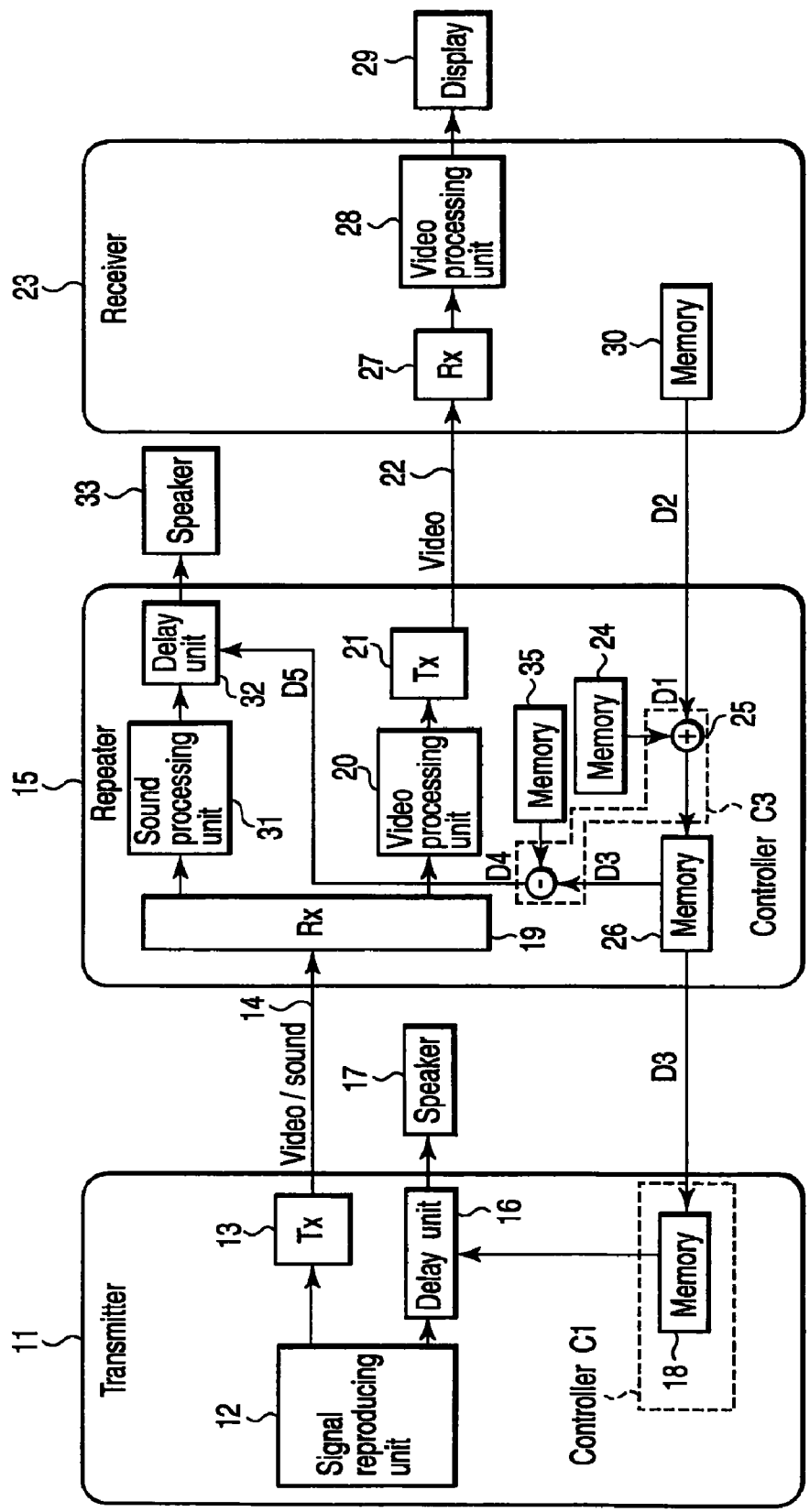
F I G. 4

INFORMATION PROCESSING DEVICE FOR RELAYING STREAMING DATA

CROSS-REFERENCE TO RELATED APPLICATIONS

This application is based upon and claims the benefit of priority from Japanese Patent Application No. 2004-376453, filed Dec. 27, 2004, the entire contents of which are incorporated herein by reference.

BACKGROUND

1. Field

Embodiments of the present invention relate to an information processing device for receiving and processing streaming data, such as video data and/or audio data for an externally connected device and an information relaying method in the information processing device.

2. Description of the Related Art

As is well known, digital visual interface (also referred as "DVI") standard have widely been provided for transmission of digital video data. Recently, high definition multimedia interface (also referred as "HDMI") standards have been used as digital data transmission standards, an improvement of the DVI standard.

This HDMI standard involves multiplexing digital audio data during a blanking period of a digital video data for transmission of audio data, transmitting the digital video data in RGB signal format as well as in YCbCr signal format or in higher-quality YPbPr signal format, connecting with the use of small sized HDMI connectors similar to universal serial bus (also referred as "USB") connectors, and featuring other functions which are not available in the common DVI standard.

In the HDMI standard, when streaming data such as video and/or audio data is transmitted from a transmitting device to a receiving device, the transmitting device acquires extended display identification (also referred as "EDID") data fro the receiving device. This enables the output of the data in a format corresponding to the display specification of a display accompanied with the receiving device.

In the HDMI standard, it is also possible to transmit streaming data such as video and/or audio data from a transmitting device to a receiving device through one or more repeaters or relays. In this case, the transmitting device acquires the EDID data from the receiving device through the repeater.

The streaming data output form the transmitting device, namely the video and audio mutually in synchronization with each other, passes through the repeater, and the receiving device performs the data processing for displaying the video and playback of the audio. Thereby, a different time lag may be generated, and a synchronization deviation may occur between the video and audio.

The Japanese Patent Application Publication (Kokai) No. 2002-6817 discloses a system for converting the format of video signals outputted from an image supplying device by a signal format converter and displaying the signals on a display device. Each of the signal format converter and the display in the system has a storage medium, which stores its own characteristic information therein, and the image supplying device acquires the characteristic information stored in the storage mediums so as to adjust the image quality to be output. However, the above reference does not disclose anything about a synchronization deviation.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

FIG. 4 is an exemplary block diagram showing a streaming data transmission system according to a second embodiment of the present invention.

DETAILED DESCRIPTION

Various embodiments according to the present invention will be described hereinafter with reference to the accompanying drawings. In general, according to one embodiment of the invention, an information processing device coupled between a first external device and a second external device comprises a first receiver to receive streaming data from the first external device, a processor to perform a data processing on the streaming data received by the receiver, a memory to store first data indicating a first delay time in which the processor takes for the data processing, a first transmitter to transmit the streaming data to the second external device after the data processing by the processor, a second receiver to receive second data indicating a second delay time to be needed in the second external device before display of the streaming data; an adder to calculate a third delay time by adding the first delay time and the second delay time, and a second transmitter to transmit third data indicating the third delay time to the first external device.

Figure 1:
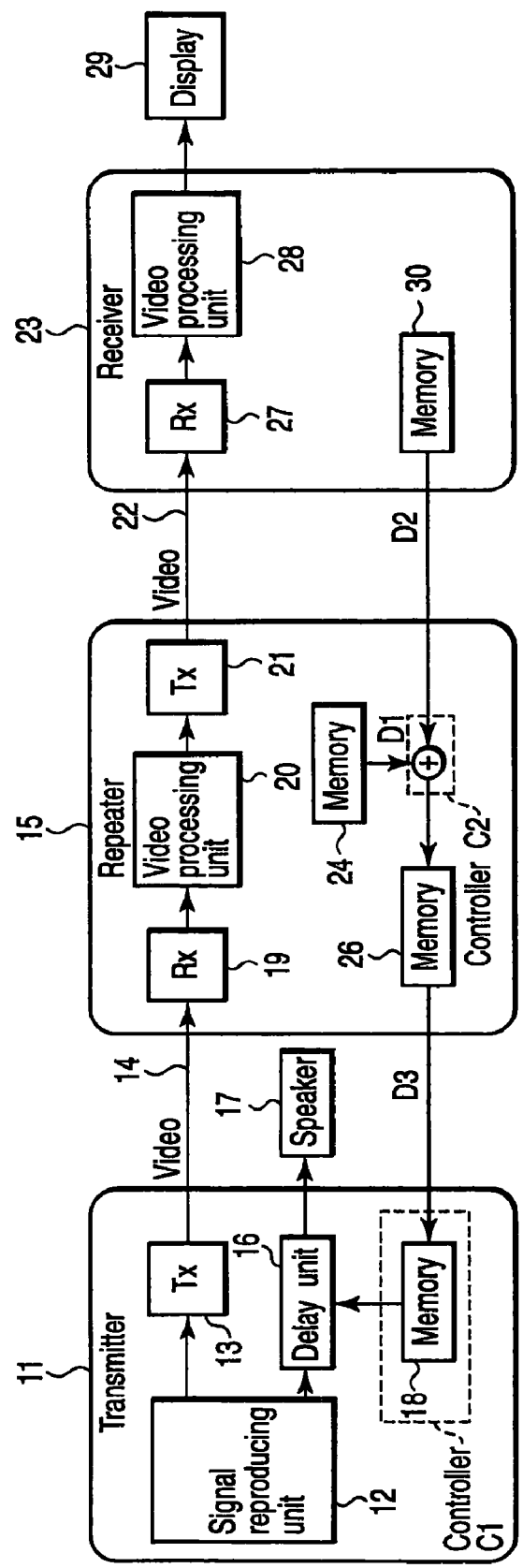
FIG. 1 is an exemplary block diagram showing a streaming data transmission system according to a first embodiment of the present invention.

FIG. 1 shows an exemplary streaming data transmission system according to a first embodiment of the present invention. The streaming data transmission system transmits streaming data, such as video data and/or audio data for example, which is a digital signal. The streaming data transmission system includes a transmitter 11, a repeater 15, and a receiver 23. According to this embodiment of the invention, the transmitter 11 is an electronic device operating as a source such as an optical disk player, which reproduces streaming data stored in an optical disk such as a digital versatile disk (also referred as "DVD"). The repeater 15 relays streaming data from the transmitter 11 to the receiver 23, and is also referred to as a "relay".

More specifically, according to one embodiment of the invention, the transmitter 11 comprises a signal reproducing unit 12, an HDMI transmitter 13 coupled to the signal reproducing unit 12, a delay unit 16 coupled to the signal reproducing unit 12 and externally coupled to a speaker 17, a controller C1 coupled to the delay unit 16, and a memory 18 coupled to the controller C1.

The signal reproducing unit 12 reproduces video signals (also referred as "video data") and audio signals (also referred as "audio data") from, for example, the DVD and the like. The video signal reproduced by the signal reproducing unit 12 is supplied to the HDMI transmitter 13. The HDMI transmitter 13 converts the video signal into the form conforming to the HDMI standard, the HDMI streaming data. Then, the HDMI transmitter 13 transmits the HDMI streaming data to the repeater 15 which is an electronic device through a transmission channel 14. The repeater 15 is, for example, an optical disk player such as a DVD player.

The audio signal reproduced by the signal reproducing unit 12 is supplied to the delay unit 16. The delay unit 16 delays output of the audio signal for a predetermined time, and then, supplies the audio signal to the speaker 17 for playback of the sound.

The delay unit 16 controls a delay time for the audio signal on the basis of data indicating delay time or delay amount stored in the memory 18 provided in the transmitter 11.

The repeater 15 comprises an HDMI receiver 19 coupled to the transmission channel 14, a video processing unit 15 coupled to the HDMI receiver 19, and an HDMI transmitter 21 coupled to the video processing unit 15. In addition, the repeater 15 includes a memory 24, a controller C2 coupled to the memory 24 and having a function as an adder, and a memory 26 coupled to the controller C2.

The HDMI receiver 19 in the repeater 15 receives the HDMI streaming data including the video signal supplied from the transmitter 11 through the transmission channel 14. The HDMI receiver 19 converts the inputted HDMI streaming data in the form conforming to the HDMI standard into the original video signal, and supplies the video signal to the video processing unit 20.

The video processing unit 20 performs the video signal processing such as restoring the deterioration occurring in the transmission on the inputted video signal and like. The video signal processing in the video processing unit 20 includes any processing to be needed as the repeater 15.

The video signal outputted from the video processing unit 20 is supplied to the HDMI transmitter 21. The HDMI transmitter 21 converts the video signal into the form conforming to the HDMI standard again, the HDMI streaming data, and transmits the HDMI streaming data to a receiver 23 through a transmission channel 22. The receiver 23 is, for example, a TV receiver or the like.

The memory 24 in the repeater 15 stores data indicating a video delay time or amount D1 (hereinafter collectively referred as "video delay amount D1") required for the signal processing by the video processing unit 20.

The controller C2 in the repeater 15 acquires a video delay time or amount D2 (hereinafter collectively referred as "video delay amount D2") from the receiver 23, and adds the video delay amount D1 stored in the memory 24 to the video delay amount D2. The controller C2 stores the added video delay time or amount D3 (hereinafter collectively referred as "video delay amount D3") into the memory 26 as an Extended Display Identification (also referred as "EDID") data.

The receiver 23 comprises an HDMI receiver 27 coupled to the transmission channel 22, a video processing unit 28 coupled to the HDMI receiver 27 and externally coupled to a display 29, and a memory 30.

The HDMI receiver 27 in the receiver 23 receives the HDMI streaming data including video signal supplied from the repeater 15 through the transmission channel 22. The HDMI receiver 27 converts the inputted video signal in the form conforming to the HDMI standard into the original video signal, and supplies the video signal to the video processing unit 28. The video processing unit 28 performs on the inputted video signal, the signal processing in accordance with a display specification corresponding to the display 29, so as to show the video on the display 29.

The memory 30 in the receiver 23 stores the video delay amount D2 required for the signal processing by the video processing unit 28 as the EDID data.

Figure 2:
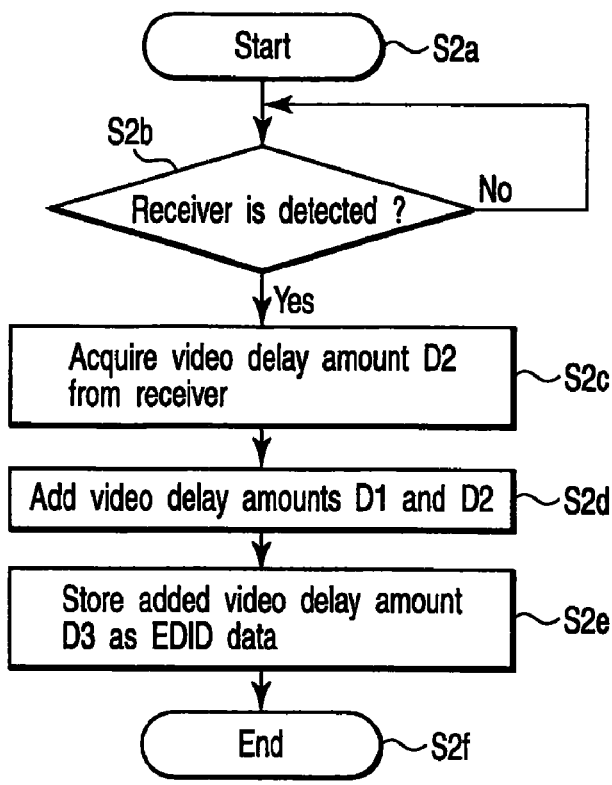
FIG. 2 is an exemplary flowchart showing a processing operation of a repeater in the streaming data transmission system according to the first embodiment.

FIG. 2 shows an exemplary processing operation of the controller C2 in the repeater 15 of FIG. 1. Upon starting the processing (block S2a), the controller C2 in the repeater 15 of FIG. 1 detects whether or not the receiver 23 is connected (block S2b). If a cable complying with the HDMI standard connects between the repeater 15 and the receiver 23, the controller C2, which complies with the HDMI standard, detects the connection. The cable configures the transmission channel 22, and transmits the data stored in the memory 30.

When the controller C2 detects that the receiver 23 is connected, the controller C2 requests the receiver 23 to transmit the video delay amount D2 as shown in block S2c.

The controller C2 receives the video delay amount D2, and calculates a video delay amount D3 by adding the video delay amount D2 from the receiver 23 to the video delay amount D1 stored into the memory 24 (block S2d). Then, the controller C2 stores the video delay amount D3 into the memory 26 as the EDID data (block S2e), and the controller C2 in the repeater 15 finishes the processing (block S2f).

Figure 3:
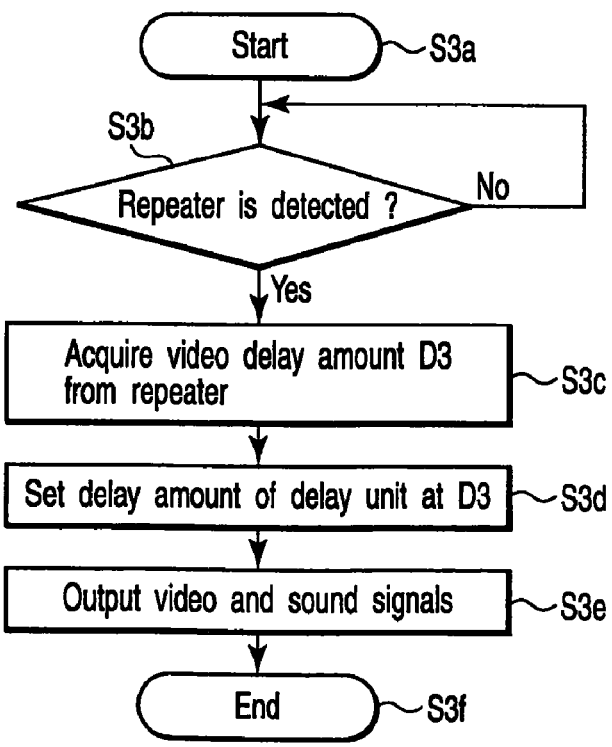
FIG. 3 is an exemplary flowchart showing a processing operation of a transmitter in the streaming data transmission system according to the first embodiment.

FIG. 3 shows an exemplary processing operation of the transmitter 11, mainly a processing operation of the controller C1 of FIG. 1. Upon staring the processing (block S3a), the controller C1 detects whether or not the repeater 15 is connected (block S3b). If a cable complying with the HDMI standard connects between the transmitter 11 and the repeater 15, the controller C1, which complies with the HDMI standard, detects the connection. The cable configures the transmission channel 14, and transmits the data stored in the memory 26 to the transmitter 11.

When the controller C1 detects that the repeater 15 connected thereto exists, the controller C1 in the transmitter 11 requests the repeater 15 to transmit the video delay amount D3 (block S3c).

Thereafter, the controller C1 in the transmitter 11 stores the video delay amount D3 acquired from the repeater 15 into the memory 18 of FIG. 1 (block S3d), whereby setting the delay amount D3 in the delay unit 16. The transmitter 11 outputs the video and audio signals from the signal reproducing unit 12 (block S3e), and the transmitter 11 finishes the processing (block S3f).

According to the first embodiment, as described above, when the receiver 23 is connected, the controller C2 in the repeater 15 obtains the video delay amount D2, adds it to the video delay amount D1, and stores the video delay amount D3 as the EDID data.

Therefore, when the repeater 15 is connected, the controller C1 in the transmitter 11 may obtain the video delay amount D3 obtained from the repeater 15, and sets the video delay amount into the delay unit 16.

Accordingly, the transmitter 11 may delay the audio signal on the basis of the video delay amount D3, and the video outputted from the transmitter 11 and showed on the display of the receiver 23 through the repeater 15 may be synchronized with the audio outputted from the transmitter 11 and then the speaker 17 for playback.

FIG. 4 shows an exemplary streaming data transmission system according to a second embodiment of the present invention. In FIG. 4, the same reference numerals are attached to the same components as in FIG. 1. In the second embodiment, the repeater 15 includes an audio processing unit 31 coupled to the HDMI receiver 19, a delay unit 32 coupled to the audio processing unit 31 and externally coupled to a speaker 33, a controller C3, and a memory 35. The controller C3 has a function as a subtracter in addition to as an adder.

The signal reproducing unit 12 in the transmitter 11 reproduces the video signals and the audio signals, and the HDMI transmitter 13 converts the video signals and the audio signals into the form conforming to the HDMI standard, the HDMI streaming data. The HDMI transmitter 13 transmits the HDMI streaming data to the repeater 15 through the transmission channel 14.

In the repeater 15, the HDMI receiver 19 receives the HDMI streaming data including the video and the audio signals, and converts it into the original video and audio signals. The video signals are supplied to the video processing unit 20, and the audio signals are supplied to the audio processing unit 31. The audio processing unit 31 performs, on the inputted audio signal, an audio signal processing such as restoring the deterioration caused during the transmission.

After the audio signal processing performed by the audio processing unit 31, the audio signals are supplied to the delay unit 32 and delayed for a predetermined time, and then supplied to the speaker 33 for the audio playback. The delay unit 32 is to control the delay time or amount as for the audio signal on the basis of a delay time or amount outputted from the controller C3 in the repeater 15.

As described above, the repeater 15 includes the memory 35 having stored therein the audio delay time or amount D4 (hereinafter "audio delay amount D4") required for the audio signal processing by the audio processing unit 31. The controller C3 calculates a delay time or amount D5 (hereinafter "delay amount D5") by subtracting the audio delay amount D4 stored in the memory 35 from the video delay amount D3 stored in the memory 26. The delay amount D5 calculated by the controller C3 is given to the delay unit 32.

Figure 5:
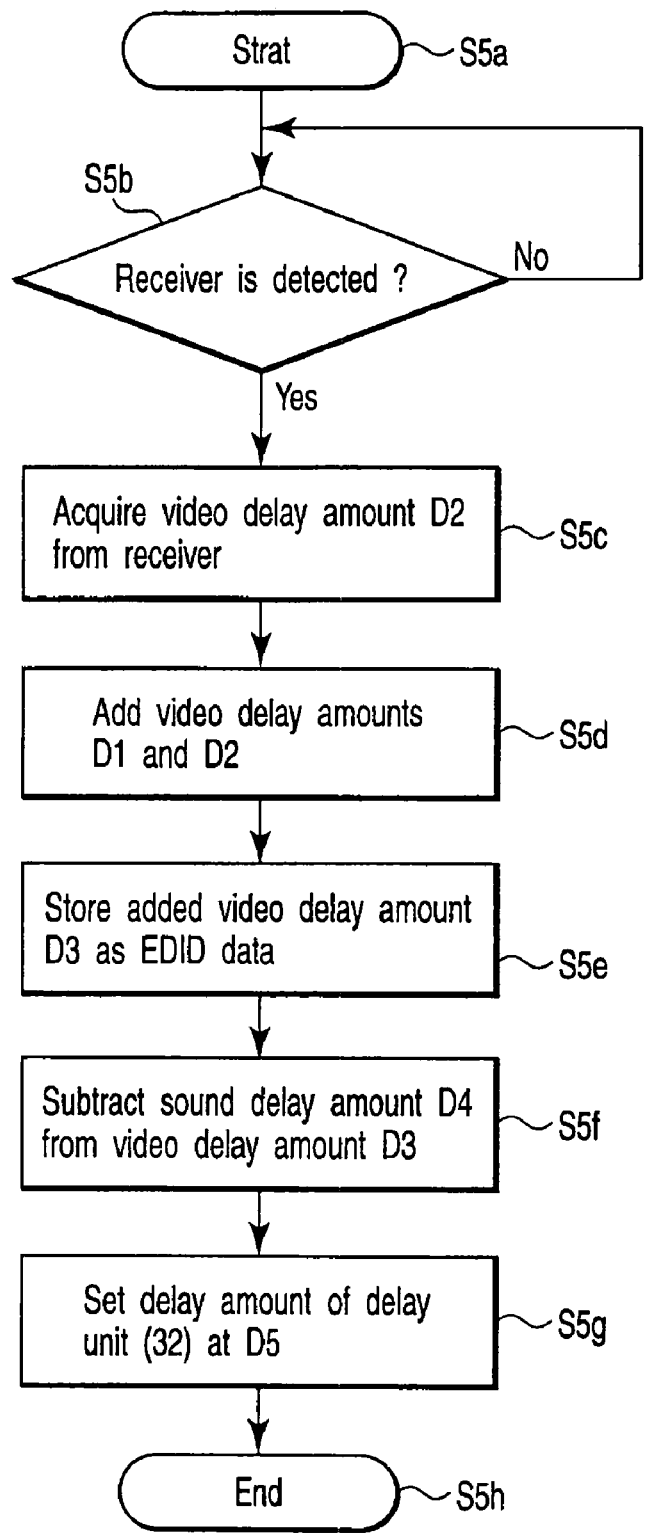
FIG. 5 is an exemplary flowchart showing a processing operation of a repeater in the streaming data transmission system according to the second embodiment.

FIG. 5 shows an exemplary processing operation of the controller C3 in the repeater 15 shown in FIG. 4. Upon starting the processing (block S5a), the controller C3 detects whether or not the receiver 23 is connected (block S5b). Similar to the first embodiment, if a cable complying with the HDMI standard connects between the repeater 15 and the receiver 23, the controller C3, which complies with the HDMI standard, detects the connection. The cable configures the transmission channel 22, and transmits the data stored in the memory 30.

When the controller C3 detects that the receiver 23 is connected, the controller C3 requests the receiver 23 as shown in block S5c to transmit the video delay amount D2.

The controller C3 receives the video delay amount D2 from the receiver 23, and calculates its video delay amount D3 by adding the video delay amount D2 to the video delay amount D1 stored into the memory 24 (block S5d). Then, the controller C3 stores the video delay amount D3 into the memory 26 as the EDID data as shown in block S5e.

Next, as shown in block s5f, the controller C3 as a subtracter calculates the delay amount D5 by subtracting the audio delay amount D4 stored in the memory 35 from the video delay amount D3 stored in the memory 26, and sets the delay amount in the delay unit 32 as the delay amount D5 of the subtraction result (block S5g). Thereafter, the controller C3 of the repeater 15 finishes the processing (block S5h).

According to the second embodiment shown in FIG. 4, the controller C3 subtracts the audio delay amount D4 in the repeater 15 from the video delay amount D3 which is obtained by adding the video delay amount D2 of the receiver 23 and the own video delay amount D1, and sets the delay amount into the delay unit 32 so as to delay the audio signal according to the subtracted delay amount D5.

Accordingly, the video outputted from the transmitter 11 and shown on the display 29 of the receiver 23 through the repeater 15 may be synchronized with the audio outputted from the transmitter 11 and output by the speaker 33 through the repeater 15.

Here, in the first and second embodiments, the description has been made in the case where the video signal outputted from the transmitter 11 is shown on the display 29 of the receiver 23, and the audio signal outputted from the transmitter 11 is output to the speaker 17 coupled to the transmitter 11 or the speaker 33 coupled to the repeater 15, respectively.

However, the invention is not restricted to this, but the video may be synchronized with the audio similarly in the case where the audio signal output from the transmitter 11 is output to the speaker provided in the receiver 23 for playback and the video signal output from the transmitter 11 is shown on the display provided on the transmitter 11 or the repeater 15. In such the case, the total of the audio delay amounts is calculated and the video output is delayed accordingly.

The invention is also not restricted to the above-mentioned embodiments themselves, but various modifications of the components may be embodied within departing from the scope. By properly combining a plurality of components disclosed in the above embodiments, various inventions may be formed. For example, some of the whole components shown in the embodiments may be deleted. Further, the components according to the different embodiments may be properly combined together.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A method, comprising:
receiving a first delay time by an information processing device, the first delay time being a time value needed by an external device to process streaming data that is transmitted from the information processing device;
calculating a third delay time by an adder circuit implemented within the information processing device, the adder circuit adding the first delay time to a second delay time to produce the third delay time that identifies an amount of delay imposed by another external device before outputting audio data of the streaming data to a speaker of the another external device, in order to synchronize continued playback of the audio data and the video data, the second delay time being a time value needed by the information processing device to process the video data of the streaming data prior to transmission;
calculating a fifth delay time by a subtractor circuit implemented within the information processing device, the subtractor circuit subtracting a fourth delay time from the third delay time to produce the fifth delay time that identifies an amount of delay imposed by the information processing device before outputting the audio data of the streaming data to a speaker of the information processing device, in order to synchronize continued playback of the audio data and the video data, the fourth delay time being a time value needed by the information processing device to process the audio data of the streaming data; and outputting the third delay time from the information processing device.

2. A method according to claim 1, further comprising storing the third delay time in a memory implemented within the information processing device.

3. A method according to claim 1, wherein the memory stores the third delay time as an Extended Display Identification (EDID).

4. A data transmission system, comprising:
a first electronic device outputting streaming data, the streaming data including at least video data and audio data; and
a second electronic device, comprising:
a processor receiving the streaming data and processing at least the video data and the audio data contained in the streaming data;
a first memory adapted to store first data indicating a first delay time for the processor to process the video data;
a second memory adapted to store fourth data indicating a fourth delay time for the processor to process the audio data; and
a controller that receives second data indicating a second delay time, the second delay time identifying a time delay in rendering the video data for display as experienced by a device other than the second electronic device, the controller determining a third delay time based on addition of the first delay time and the second delay time, the third delay time being provided to the first electronic device and used by the first electronic device to delay output of the audio data to a speaker of the first electronic device, in order to synchronize playback the audio data with the video data, the controller further determining a fifth delay time identifying an amount of delay imposed by a delay unit of the second electronic device before outputting the audio data of the streaming data to a speaker of the second electronic device, in order to synchronize playback of the audio data and the video data, the fifth delay time being determined by subtracting the fourth delay time from the third delay time.

5. An apparatus, comprising:
a processor to receive streaming data from a first external device and to process at least video data and audio data contained in the streaming data, wherein at least the video data contained in the streaming data is transmitted to a second external device after said processing;
a first memory to store first data indicating a first delay time for the processor to process the video data;
a second memory to store fourth data indicating a fourth delay time for the processor to process the audio data; and
a controller that receives second data indicating a second delay time, the second delay time identifying a time delay associated with the second external device in rendering video data for display, wherein the controller comprises:
an adder determining a third delay time by adding the first delay time and the second delay time, the third delay time identifying an amount of delay in outputting audio data of the streaming data to a speaker of the first external device, in order to synchronize playback of the audio data with the video data, and wherein the controller transmits third data that includes the third delay time to the first external device; and
a subtractor that determines a fifth delay time identifying an amount of delay imposed by the apparatus before outputting the audio data of the streaming data to a speaker of the apparatus, in order to synchronize playback of the audio data and the video data, the fifth delay time being determined by subtracting the fourth delay time from the third delay time.

6. An apparatus according to claim 5, further comprising a third memory to store the third data.

7. An apparatus according to claim 5, wherein the subtractor provides the fifth delay time to a delay unit of the apparatus in order to delay playback of the audio data by the fifth delay time.

8. An apparatus according to claim 5, wherein the processor restores deterioration occurring in the received streaming data.

9. An information processing device, comprising:
a receiver to receive streaming data from a first external device;
a processor to process video data and audio data associated with the streaming data received by the receiver;
a first memory to store first data indicating a first delay time for the processor to process the video data of the streaming data;
a second memory to store fourth data indicating a fourth delay time for the processor to process the audio data of the streaming data;
a transmitter to transmit the streaming data to a second external device after processing the video data of the streaming data by the processor; and
a controller that receives second data indicating a second delay time for the second external device to process and display the video data of the streaming data received from the transmitter, the controller including:
an adder that determines a third delay time identifying an amount of delay imposed by the first external device before outputting audio data of the streaming data to a speaker of the first external device, in order to synchronize continued playback of the audio data and the video data, the third delay time being determined by adding the first delay time stored in the first memory and the second delay time received from the second external device; and
a subtractor that determines a fifth delay time identifying an amount of delay imposed by a delay unit of the information processing device before outputting the audio data of the streaming data to a speaker of the information processing device, in order to synchronize continued playback of the audio data and the video data, the fifth delay time being determined by subtracting the fourth delay time from the third delay time.

10. An information processing device according to claim 9, wherein the receiver receives the streaming data in the form conforming to a High Definition Multimedia Interface (HDMI) standard.

11. An information processing device according to claim 9, wherein the transmitter transmits the streaming data in the form conforming to a High Definition Multimedia Interface (HDMI) standard.

12. An information processing device according to claim 9, further comprising a third memory to store third data including the third delay time.

13. An information processing device according to claim 12, wherein the third memory stores the third data as an Extended Display Identification (EDID).

14. An information processing device according to claim 1, wherein the processor restores deterioration occurring in the received streaming data.

* * * * *